PHASE MODULATOR USING A FIELD-EFFECT TRANSISTOR

Filed Feb. 15, 1967 2 Sheets-Sheet 1

INVENTOR.
ROBERT C. MOSES
H. H. Losche
Paul S. Collignon
Attorneys

INVENTOR.
ROBERT C. MOSES
H. H. Losche
Paul S. Collignon
Attorneys

United States Patent Office 3,394,322
Patented July 23, 1968

3,394,322
PHASE MODULATOR USING A FIELD-EFFECT TRANSISTOR

Robert C. Moses, Malibu, Calif., assignor, by mesne assignments, to the United States of America as represented by the Secretary of the Navy Filed Feb. 15, 1967, Ser. No. 617,019
1 Claim. (Cl. 332—16)

ABSTRACT OF THE DISCLOSURE

A phase modulating device utilizing a capacitor and variable resistor with said variable resistor being a field-effect transistor, and having an inductor shunted across the source and drain terminals of said field-effect transistor for tuning out any parasitic source-drain capacitance at the operating frequency of the device.

*Background of the invention*

The present invention relates to a device for phase modulating a frequency stabilized CW carrier and utilizes a single field-effect transistor as a voltage variable resistive element in a passive phase shifting network.

One heretofore known device for phase modulating a stabilized carrier, generates the sidebands and carrier separately and then combines the two components in a quadrature phase relationship. This device, however, is restricted only to small phase deviations and, accordingly, is a narrow band system.

Another heretofore known device for phase modulating a stabilized carrier generates FM directly and utilizes a voltage-variable reactance element operating upon a self-controlled carrier source, the center frequency of which is stabilized by auxiliary means.

Both of the above-mentioned devices for phase modulating a stabilized carrier are relatively complex. Also both devices require high order frequency multiplication to arrive at a value of modulation index compatible with the wideband FM case.

*Summary of the invention*

In a preferred embodiment of the present invention, a carrier signal is applied as an input to a phase modulating circuit and is first amplified by a conventional transistor amplifier. The output of the transistor amplifier is then applied through a tank circuit to a phase shifting network comprised of a first capacitor and a junction field-effect transistor. This field-effect transistor is operated at zero D-C source-to-drain voltage, and a reverse D-C bias is applied to the gate through first and second resistors. An A-C modulating signal is coupled through a second capacitor to the gate of the field effect transistor. The field-effect transistor is biased so that a nominal phase shift of approximately 90 degrees exists between input and output voltages in the absence of a modulating signal. An inductor is shunted across the source and drain electrodes of the field-effect transistor, and this inductor tunes out the parasitic source-drain capacitance at the operating frequency thereby allowing the field-effect transistor to appear purely resistive, as far as the phase shifting network is concerned. The phase modulated input signal appears between the output terminal and ground and, in utilization, the output would be applied to a high impedance load in order not to disturb the phase shifting network.

*Description of the preferred embodiment*

Figure 1:
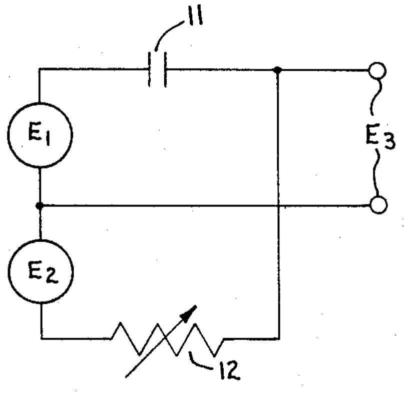
FIGURE 1 is a diagrammatic view of a phase shifting network.
Figure 2:
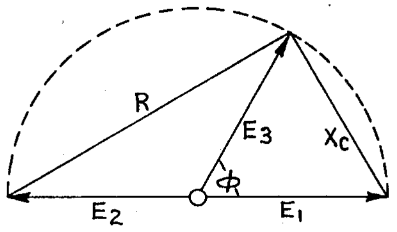
FIGURE 2 is a view showing a phasor diagram for the phase shifting network of FIGURE 1.

Referring first to FIGURES 1 and 2 of the drawing, voltages E1 and E2 are connected across an R-C network consisting of a capacitor 11 and a variable resistor 12. When voltages E1 and E2 are equal and 180 degrees out of phase, the vector voltage, E3 will be phase shifted with respect to voltage E1 according to the relationship:

$$\theta/2=\cot^{-1}\omega CR \qquad (1)$$

where:

$\theta$=phase angle in degrees
$C$=capacitance in $\mu$f.
$R$=resistance in ohms
$\omega$=radian frequency in mHz.

As can be seen from Equation 1, the phase shifting network of FIGURE 1 is capable of very nearly 180 degrees of phase shift, as contrasted with the simple series RC network whose maximum phase shift is somewhat less than 90 degrees. By making the resistive element 12 variable over some range, for example $Xc/10$ to $10Xc$, the phase of voltage E3 relative to that of voltage E1, will vary between approximately 168 degrees and 11 degrees, according to a cotangent law, and the magnitude of voltage E3 will remain constant. By using a junction field-effect transistor as the resistive element 12, and by operating this transistor below pinch-off source to drain D-C voltage, that is, in the ohmic region, and by applying a reverse bias to the gate, the effective resistance measured between the source and drain electrodes will then vary with gate bias in some nonlinear manner. The resulting phase shift between voltages E3 and E1 is hence controllable by the voltage applied to the gate electrode of the field-effect transistor, while the magnitude of the voltage E3 remains substantially constant.

Figure 3:
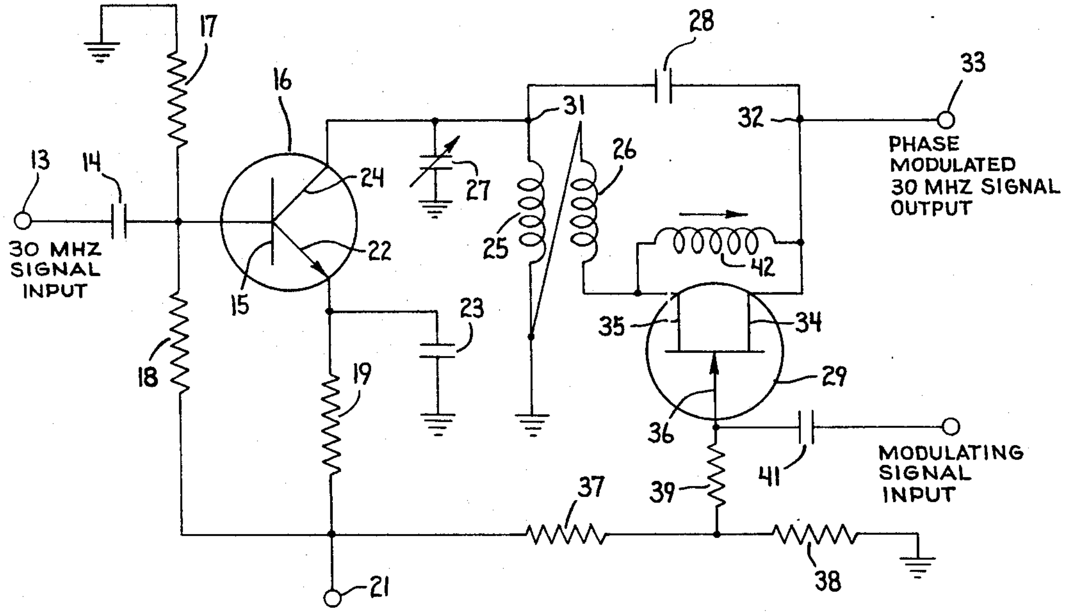
FIGURE 3 is a schematic circuit diagram of a preferred embodiment of the present invention.

Referring now to FIGURE 3 of the drawing, there is shown an embodiment of the present invention which, by way of example, might operate at 30 mHz. An input signal is supplied to terminal 13 and then through capacitor 14 to the base electrode 15 of transistor 16. Transistor 16 is biased in a conventional manner by means of resistors 17, 18, and 19, and by a negative supply voltage which is applied to terminal 21. Emitter electrode 22 of transistor 16, in addition to being connected through resistor 19 to terminal 21, is connected through capacitor 23 to ground, and collector electrode 24 is connected to a tank circuit which is comprised of coils 25 and 26. A tuning capacitor 27 is provided, and the output of the tank circuit is centered at 30 mHz. and provides 180 degrees equal amplitude signal components to the voltage-variable phase shifting network consisting of capacitor 28 and junction field-effect transistor 29.

One end of capacitor 28 is connected to junction point 31 which is common to one end of coil 25 and to collector electrode 24. The other end of capacitor 28 is connected to junction point 32 which is common to output terminal 33 and the drain electrode 34 of field-effect transistor 29. The other end of coil 25 is connected to ground. Coil 26 has one end connected to ground and the other end is connected to the source electrode 35 of field-effect transistor 29.

A reverse D-C bias is applied to the gate electrode 36 of field-effect transistor 29 by means of the negative supply voltage which is applied at terminal 21 and by resistors 37, 38, and 39. An A-C modulating signal is applied to gate electrode 36 through capacitor 41, and the bias conditions of field-effect transistor 29 are adjusted so that a nominal phase shift of approximately 90 degrees exists between input and output voltages in the absence of a modulating signal. An inductor 42 is connected across source electrode 35 and drain electrode 34 and inductor 42 tunes out the parasitic source-drain capacitance at the operating frequency thereby allowing the field-effect transistor to appear purely resistive, as far as the phase shifting network is concerned.

The circuit shown in FIGURE 3 of the drawing was constructed using the following values for the various components:

| | |
|---|---|
| Resistor **17**: 4.7K ohms | Capacitor **23**: .001 $\mu$f. |
| Resistor **18**: 4.7K ohms | Capacitor **27**: 0.8–14 pf. |
| Resistor **19**: 680 ohms | Capacitor **28**: 2.2 pf. |
| Resistor **37**: 11K ohms | Capacitor **41**: 0.1 $\mu$f. |
| Resistor **38**: 2K ohms | Inductor **42**: 5.0–12 $\mu$h. |
| Resistor **39**: 470K ohms | Transistor **16**: 2N918 |
| Capacitor **14**: 100 pf. | Transistor **29**: 2N3824 |

The tank circuit is comprised of 12 turns of #33 wire, which is bifilar wound on a T37–6 toroidal core.

The operation of the circuit shown in FIGURE 3 of the drawing will now be hereinafter described for a frequency of 30 mHz. which is applied as an input signal to terminal 13. The signal is amplified by transistor 16 and then fed to the tank circuit and the phase shifting network. The output tank circuit with the associated tuning capacitor 27 are centered at 30 mHz. and provide 180 degree equal amplitude signal components to the voltage-variable phase shifting network consisting of capacitor 28 and the junction field-effect transistor 29 which is operated at zero D-C source-to-drain voltage. A reverse D-C bias is applied to the gate electrode 36 of transistor 29, while the A-C modulating signal is coupled through capacitor 41 to gate electrode 36. The bias conditions of transistor 29 are adjusted so that a nominal phase shift of approximately 90 degrees exists between input and output voltages in the absence of a modulating signal. The inductor 42 tunes out the parasitic source-drain capacitance at the operating frequency and allows transistor 29 to appear purely resistive, as far as the phase shifting network is concerned. The phase modulated 30 mHz. signal appears between the output terminal and ground and should be terminated in a high impedance load, such as an insulated gate, field-effect transistor amplifier having low input capacitance, in order not to disturb the phase shifting network.

Figure 4:
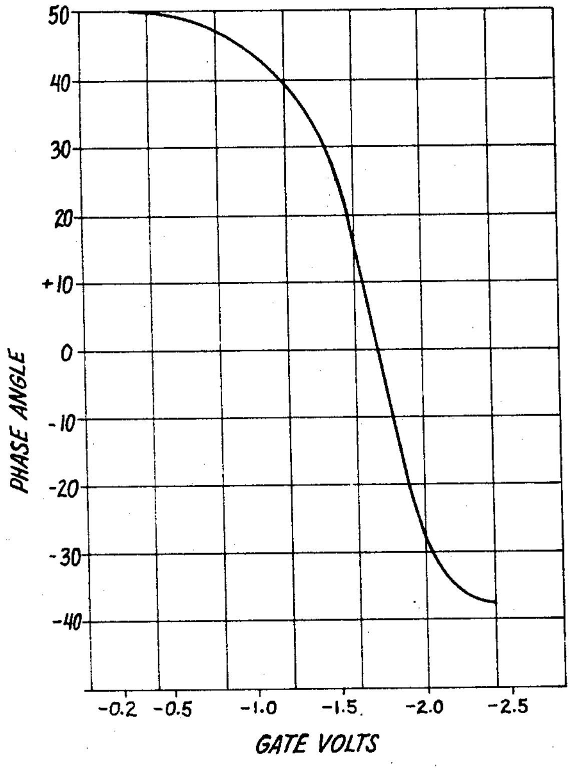
FIGURE 4 is a graph showing the relationship between phase angle and gate voltage on a field-effect transistor.
Figure 5:
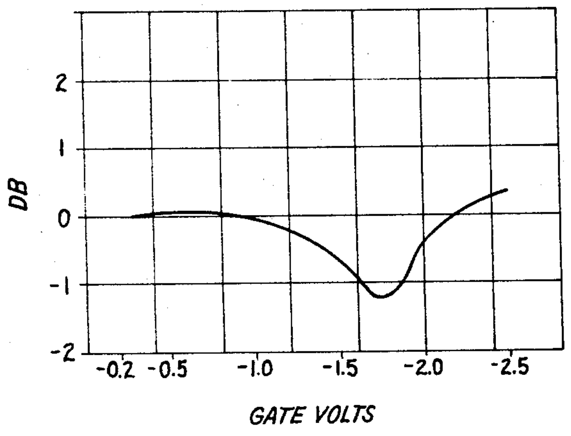
FIGURE 5 is a graph showing the effect of gate voltage on amplitude linearity.

Referring now to FIGURES 4 and 5 of the drawing, there are shown graphs which were plotted from various test data which was obtained from a circuit built in accordance with the circuit of FIGURE 3 of the drawing. FIGURE 4 is a graph showing the relationship of phase angle and gate voltage, while FIGURE 5 is a graph showing the relationship of amplitude and gate voltage, taken over the linear region of interest. These graphs indicate the ability of the circuit of FIGURE 3 of the drawing to provide linear phase modulation over 1 radian of phase deviation with a maximum amplitude variation of $\pm 1.2$ db.

It can thus be seen that the present invention provides an improved device for phase modulating a frequency stabilized carrier by utilizing a voltage variable resistive element in a passive phase shifting network. Obviously many modifications and variations of the present invention are possible in the light of the above teachings. It is therefore to be understood, that within the scope of the appended claim, the invention may be practiced otherwise than as specifically described.

I claim:

1. A phase modulating circuit comprising:

a first input means for coupling to a signal source, for receiving a continuous wave carrier signal to be modulated;

transistor amplifying means for amplifying said continuous wave carrier signal from said signal source, said transistor amplifying means having base, emitter, and collector electrodes, said base electrode being capacitively coupled to said first input means for receiving said continuous wave carrier signal to be modulated;

first, second, and third resistance means, said first resistance means coupling said base electrode to ground potential, said second resistance means coupling said base electrode to a source of negative direct current biasing potential, and said third resistance means coupling said emitter electrode to said source of negative direct current biasing potential;

a first capacitance means coupling said emitter electrode to ground potential;

a tank circuit coupled between said collector electrode of said transistor amplifying means and ground potential, said tank circuit including a variable tuning capacitance and a bifilar-wound inductance for producing from said continuous wave carrier signal, a pair of signals of equal amplitude but opposite in phase with respect to each other;

a phase shifting modulating network coupled to said tank circuit, said modulating network including a second capacitance means and a field effect transistor having a gate electrode, a source electrode, and a drain electrode, said source electrode being coupled to an end terminal of said bifilar-wound inductance, said drain electrode being coupled in series with said second capacitance means to the other end terminal of said bifilar-wound inductance, and said gate electrode being resistively coupled to a point between said source of negative direct current biasing potential and ground potential;

a second input means capacitively coupled to said gate electrode for receiving a modulating signal from a modulating signal source;

a second inductance means coupled across said drain and said source electrodes of said field-effect transistor for effectively canceling source-drain parasitic capacitance at the operating frequency of said phase modulating circuit; and output means coupled to the junction of said drain electrode and said second capacitance means for providing a phase modulated output signal thereat.

References Cited

UNITED STATES PATENTS

| | | | |
|---|---|---|---|
| 2,316,155 | 4/1943 | Crosby | 332—27 |
| 3,258,720 | 6/1966 | Tartas | 331—116 |
| 3,289,102 | 11/1966 | Hayashi | 307—88.5 |

OTHER REFERENCES

W. Y. Elliott, Jr.: IBM Tech. Disc. Bul. vol. 7, No. 1, June 1964, p. 111.

JOHN KOMINSKI, *Primary Examiner.*